US009995345B2

(12) United States Patent
Bonte

(10) Patent No.: US 9,995,345 B2
(45) Date of Patent: Jun. 12, 2018

(54) CARDAN DRIVE

(71) Applicant: CNH AMERICA LLC, New Holland, PA (US)

(72) Inventor: Xavier G. J. M. Bonte, Et Sint Kruis (BE)

(73) Assignee: CNH Industrial America LLC, New Holland, PA (US)

(*) Notice: Subject to any disclaimer, the term of this patent is extended or adjusted under 35 U.S.C. 154(b) by 0 days. days.

(21) Appl. No.: 14/762,656

(22) PCT Filed: Jan. 21, 2014

(86) PCT No.: PCT/EP2014/051114
§ 371 (c)(1),
(2) Date: Jul. 22, 2015

(87) PCT Pub. No.: WO2014/114634
PCT Pub. Date: Jul. 31, 2014

(65) Prior Publication Data
US 2016/0003305 A1 Jan. 7, 2016

(30) Foreign Application Priority Data
Jan. 22, 2013 (BE) .................. 2013/0040

(51) Int. Cl.
*F16C 1/04* (2006.01)
*F16D 3/26* (2006.01)
(Continued)

(52) U.S. Cl.
CPC .............. *F16D 3/26* (2013.01); *A01B 71/063* (2013.01); *F16C 35/063* (2013.01); *F16D 1/00* (2013.01); *F16D 3/32* (2013.01); *Y10S 464/905* (2013.01)

(58) Field of Classification Search
CPC .. F16C 35/063; F16C 3/32; F16C 3/33; A01B 71/063; F16D 3/32; F16D 3/33; Y10S 464/905
(Continued)

(56) References Cited

U.S. PATENT DOCUMENTS 2,139,963 A * 12/1938 Leason .................. A01B 59/04
464/117 X
2,331,982 A * 10/1943 Johnson .................. F16D 3/845
464/178 X
(Continued)

FOREIGN PATENT DOCUMENTS

| EP | 0 665 130 A1 | 1/1995 |
| GB | 835968 A | 5/1960 |
| KR | 2001-0024974 A | 3/2001 |

OTHER PUBLICATIONS

Shigley et al, Mechanical Engineering Design, 4th ed., N.Y., McGraw-Hill, 1983, pp. 484-487.*

Primary Examiner — Gregory J Binda
(74) Attorney, Agent, or Firm — Peter K. Zacharias; Patrick M. Sheldrake

(57) ABSTRACT

A Cardan drive for connecting a power take-off (PTO) of an agricultural vehicle to an input shaft of an agricultural implement, wherein the Cardan drive has a primary shaft and a secondary shaft that are mutually connected via a double universal joint to obtain a homokinetic connection between the primary and the secondary shaft, wherein the double universal joint has an intermediate element formed substantially by two yokes of the double universal joint, wherein at least one of the two yokes is connected via bearings to a frame provided for attachment to the agricultural implement.

13 Claims, 4 Drawing Sheets

(51) Int. Cl.
  *A01B 71/06* (2006.01)
  *F16D 1/00* (2006.01)
  *F16D 3/32* (2006.01)
  *F16C 35/063* (2006.01)

(58) Field of Classification Search
  USPC ........ 464/117, 118, 178, 114, 134; 180/53.1, 180/53.6, 383, 384
  See application file for complete search history.

(56) References Cited

U.S. PATENT DOCUMENTS

| | | | |
|---|---|---|---|
| 3,283,840 A * | 11/1966 | Lane | A01B 71/063 180/53.1 X |
| 3,299,979 A | 1/1967 | Restall | |
| 3,385,388 A | 5/1968 | Restall et al. | |
| 4,236,420 A * | 12/1980 | Geisthoff | A01B 71/066 464/117 X |
| 4,257,243 A * | 3/1981 | Herchenbach | F16D 3/32 464/118 |
| 4,468,208 A * | 8/1984 | Randelli | F16C 1/04 464/117 |
| 4,599,020 A * | 7/1986 | Colburn | B23B 51/101 |
| 4,615,238 A | 10/1986 | Cheatum | |
| 4,749,301 A | 6/1988 | Suzuki | |
| 4,763,743 A | 8/1988 | Ridgway | |
| 4,957,387 A | 9/1990 | Nasu | |
| 5,308,283 A * | 5/1994 | Lutz | F16D 3/41 |
| 5,427,192 A * | 6/1995 | Stephenson | A01B 71/066 464/117 X |
| 7,641,415 B2 | 1/2010 | Fox et al. | |

* cited by examiner

CARDAN DRIVE

CROSS REFERENCE TO RELATED APPLICATIONS

This application is the US National Stage filing of International Application Serial No. PCT/EP2014/051114 filed on Jan. 21, 2014 which claims priority to Belgian Application BE2013/0040 filed Jan. 22, 2013, each of which is incorporated herein by reference in its entirety.

BACKGROUND OF THE INVENTION

The invention relates to a cardan drive for connecting a power take-off (PTO) of an agricultural vehicle to an input shaft of an agricultural implement.

A cardan drive is a drive wherein one or more shafts connect a first and a second rotating element, wherein at least one universal joint is used in the connection. Agricultural vehicles such as tractors are typically provided with a power take-off (PTO). The PTO is formed by a shaft located on an outer side of the tractor and which can be driven by the tractor engine. This shaft is typically provided with toothing such that a rotating movement can be transmitted to an external element. This external element, typically an implement which is attached behind the tractor or suspended on the tractor, can then be driven and/or provided with energy via the PTO. Agricultural implements typically have an input shaft via which the implement can be driven or provided with energy. This input shaft is connected via a transmission to the PTO when the implement is connected to the tractor. This connection is typically made via a cardan drive.

Different cardan drives are known from the prior art. Two shafts can typically be provided in the cardan drive, a primary shaft and a secondary shaft. The primary shaft is connected with one end to the PTO of the tractor, and with another end to the secondary shaft. The secondary shaft is then connected with its other end (the first end being connected to the primary shaft) to the input shaft of the implement. The primary shaft typically lies here at an angle to the secondary shaft. Different couplings are known for transmitting a rotating movement of the primary shaft through an angle to the secondary shaft. An example thereof is a universal joint. In a universal joint two yokes are placed over each other at a right angle, and a cross-shaped element is connected via roller bearings to the prongs of the yokes. When a universal joint is used however, the rotation speed is not transmitted proportionally from the primary shaft to the secondary shaft, and the secondary shaft will have a sinusoidal rotation speed. A double universal joint is therefore used. Known is a double universal joint for the purpose of enabling a homokinetic connection between a primary and a secondary shaft. A homokinetic connection is here a connection wherein the input speed and the output speed are directly proportional.

Double universal joints are known on the market and are also referred to as CV joints. In such CV joints an intermediate element of the double universal joint (the intermediate element is formed by the middle two yokes) is automatically held in a correct position. This is because the rotation angle of the intermediate element has to lie in the middle between the primary and secondary shafts. When the angle between the primary shaft and the secondary shaft becomes greater and the power which is transmitted increases (as is the case with agricultural implements), known CV joints break due to overload. The force on the angle positioning means of the intermediate element in the CV joint in particular becomes greater than the maximum force which the CV joint is able to bear. As a result it is not always possible to use CV joints.

SUMMARY OF THE INVENTION

It is an object of the invention to provide a cardan drive which can bear high forces at a greater angle than the known cardan drive.

Provided for this purpose is the cardan drive according to the invention for connecting a power take-off (PTO) of an agricultural vehicle to an input shaft of an agricultural implement, wherein the cardan drive comprises a primary shaft and a secondary shaft which are mutually connected via a double universal joint so as to thus obtain a homokinetic connection between the primary and the secondary shaft, wherein the double universal joint has an intermediate element formed substantially by two yokes of the double universal joint, wherein at least one of the two yokes is connected via bearings to a frame of the agricultural implement.

According to the invention the intermediate element of the double universal joint, which is formed by two yokes of the double universal joint, is connected via bearings to a frame of the agricultural implement. The position, and thereby the rotation axis around which the intermediate element rotates, can hereby be predetermined. The intermediate element is formed substantially by two yokes of the double universal joint. Formed substantially must be interpreted here as the intermediate element comprising no significant further elements in addition to two yokes. The interpretation of an axis extending between the two yokes (as more complex cardan drives tend to be constructed) is not therefore covered by the wording that the intermediate element is formed substantially by two yokes. According to the invention at least one of the two yokes is further connected via bearings to the frame of the agricultural implement. Because the yokes are connected directly to the frame, the length of the intermediate element can be kept to a minimum. As a result the space in which the primary shaft can move remains sufficiently large to guarantee correct functioning of the cardan drive in any position of the agricultural vehicle relative to the agricultural implement.

The frame is preferably adjustable such that an and/or position of the bearings can be adjusted relative to the agricultural implement. In order to guarantee correct homokinetic operation of a double universal joint, the angle between the primary shaft and the rotation axis of the intermediate element has to be equal to the angle between the rotation axis of the intermediate element and the secondary shaft. Different tractors have their PTO at different heights. The angle of the primary shaft can hereby vary depending on which tractor is connected to the implement. This variation in angular position of the primary shaft will affect the ideal position of the intermediate element. By making the frame adjustable the angle of the intermediate element can be optimized depending on the position of the primary shaft. The cardan drive on an implement can hereby be used by multiple types of tractor.

The bearings preferably comprise at least two roller bearings. Two roller bearings is also understood to mean double row bearings. Roller bearings are known to be able to absorb a high pressure. Using two roller bearings will further have the advantage that the angular position of the intermediate element is determined unambiguously by a mounting via the two roller bearings at two locations along the rotation axis of the intermediate element.

Each yoke is preferably formed along an axis, wherein each yoke has two protruding yoke elements at the position of one end of the axis and has at the position of another end of the axis a connecting piece provided for connection to a further element of the cardan drive. Such a yoke is suitable for use in a universal joint and can be mounted in simple manner via the connecting piece.

The bearings are preferably mounted on said connecting piece. Because the bearings are mounted on the connecting piece, they are placed very close to the protruding yoke elements of the yoke. Forces can hereby be properly absorbed. When the bearings are mounted on the connecting piece of the yoke, the intermediate element consisting substantially of two yokes will further have a minimal length.

The intermediate element is preferably manufactured integrally with two yokes. Integral manufacture of the intermediate element enables the intermediate element to be manufactured with an extremely short length and high strength. The absence of a connection between a first and a second yoke prevents possible breakage of the connection.

Two integrally manufactured yokes preferably have a bearing mounting surface with a diameter greater than the distance between two protruding yoke elements of a yoke of the two yokes. Providing a bearing mounting surface enables the integrally manufactured intermediate element to be connected in simple manner via bearings to the frame. Making the diameter of the bearing mounting surface greater than the distance between two protruding yoke elements of a yoke enables the bearing to be slid over the protruding yoke elements of the yoke to a position over the bearing mounting surface. The bearing can hereby be mounted around the intermediate element.

The primary shaft is preferably formed by a first and second element which are telescopically movable relative to each other so that the length of the primary shaft is variable. Because the length of the first shaft is variable, the cardan drive can be mounted in simple manner on the PTO. Movements of the implement relative to the agricultural vehicle can further be taken up by variation in the length of the primary shaft.

The cardan drive preferably comprises successively a primary shaft, a first yoke, a first cross-shaped element, a second yoke, a third yoke, a second cross-shaped element, a fourth yoke and a secondary shaft, wherein the second and the third yoke form the intermediate element. Such a cardan drive construction is found to perform extremely well in different test and practical conditions.

The bearings are preferably mounted on the third yoke. An optimal bearing-mounting can be achieved by providing the bearings on one yoke. Variations in play which may occur between the second and the third yoke if they are formed as different elements and attached to each other, will hereby have no adverse effect on the bearing-mounting. Placing of the bearings on the third yoke enables easy disassembly of the primary shaft.

The primary shaft is preferably further provided with a homokinetic coupling with which the primary shaft can be attached to the PTO. The at which the primary shaft is attached to the PTO is typically appreciably smaller than the angle between the primary shaft and the secondary shaft. For this reason a known homokinetic coupling is therefore suitable for use between the PTO and the primary shaft and not between the primary shaft and the secondary shaft.

The secondary shaft is preferably further provided with a universal joint or spline coupling with convex spline with which the secondary shaft can be attached to the input shaft of the agricultural vehicle. The secondary shaft is typically attached in line with the input shaft of the implement. The universal coupling or spline coupling with convex spline has the function of being able to compensate for imperfections in the alignment of the secondary shaft relative to the input shaft.

The invention further relates to an agricultural implement with a cardan drive according to the invention. The intermediate element is preferably positioned here such that the angle between the rotation axis of the intermediate element and the primary shaft is equal to the angle between the rotation axis of the intermediate element and the secondary shaft. A cardan coupling with a homokinetic operation is hereby obtained.

BRIEF DESCRIPTION OF THE DRAWINGS

The invention will now be further described on the basis of an exemplary embodiment as shown in the drawing.

In the drawing.

The same or similar elements are designated in the drawing with the same reference numerals.

DETAILED DESCRIPTION OF THE INVENTION

The invention came about during the development of a baler with a high pressing power. Owing to its high power such a baler has a large flywheel which, for structural engineering reasons, lies at a relatively large angle relative to the PTO. A cardan drive has been developed for this purpose which can span the relatively large angle between PTO and input shaft as well as being suitable to high forces. It will be apparent that, despite the invention having come about as a result of the development of a baler, the invention can also be applied to other agricultural implements. The invention is not therefore limited to a cardan drive for connecting a power take-off to a baler. Different agricultural implements can be driven via a cardan drive according to the invention. Examples of such agricultural implements are a mower, a seeding implement, a forklift implement, a bulldozer shovel implement or other implements which are provided to be carried or drawn by an agricultural vehicle and which are also provided to be driven by the PTO of the agricultural vehicle.

Figure 1:
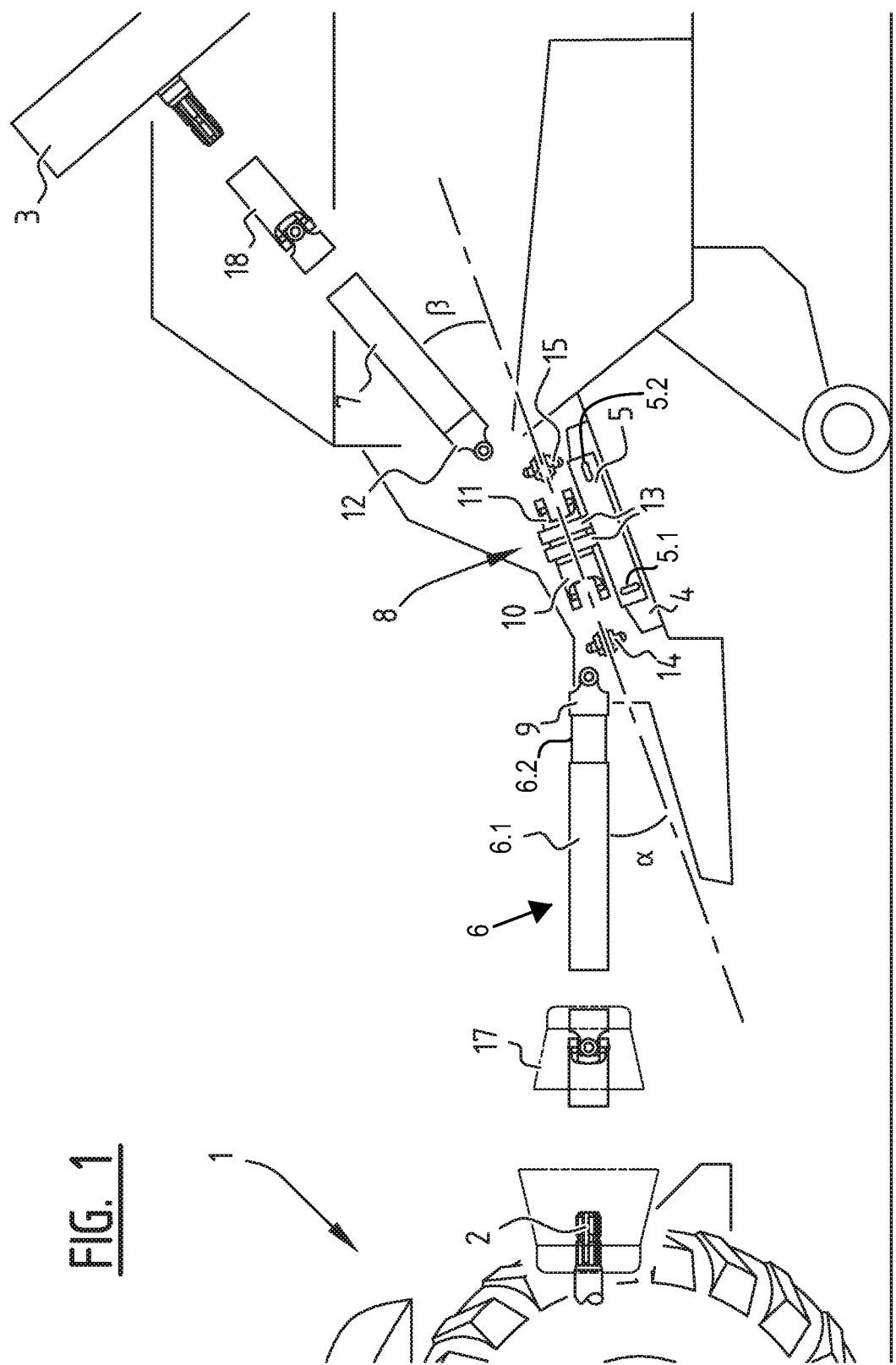
FIG. 1 shows an exploded view of a cardan drive in an embodiment according to the invention.

FIG. 1 shows an exploded view of a cardan drive applied on an agricultural vehicle with agricultural implement. The figure shows agricultural vehicle 1 with PTO 2. The figure further shows agricultural implement 4 with input shaft 3, wherein a flywheel is placed by way of illustration on the shown input shaft. The figure further shows the cardan drive with, from left to right, a homokinetic coupling 17, a primary shaft 6, a first yoke 9, a first cross-shaped element 14 and a second yoke 10. The primary shaft 6 is preferably formed by a first element 6.1 and a second element 6.2 which are telescopically movable relative to each other so that the length of the primary shaft 6 is variable. The first yoke, second yoke 10 and first cross-shaped element 14 together form a first universal joint. The figure further shows a third yoke 11, a second cross-shaped element 15 and a fourth yoke 12. Third yoke 11, fourth yoke 12 and cross-shaped element 15 together form a second universal joint. The first and second universal joints together form a double universal joint which forms a homokinetic transmission between primary shaft 6 and secondary shaft 7. The figure further shows secondary shaft 7 and a coupling element 18 for the purpose of connecting secondary shaft 7 to input shaft 3 of the implement. The figure further shows a frame 5 provided for connection to implement 4. Second yoke 10 and third yoke 11 together form intermediate element 8 of the double universal joint. This intermediate element is provided with bearings 13 which are connected to frame 5.

Figure 2:
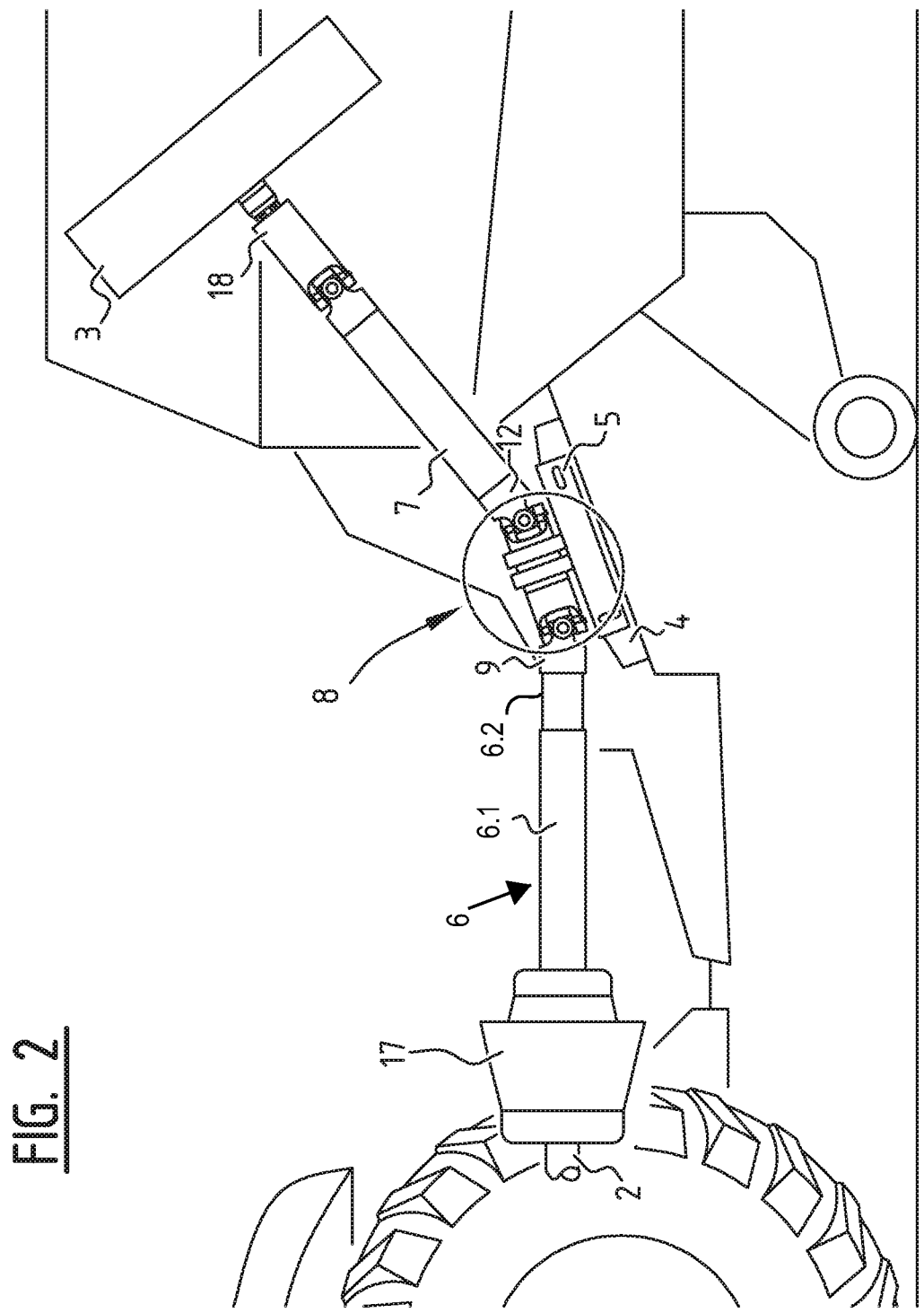
FIG. 2 shows an implement with a cardan drive according to the invention.

FIG. 2 shows an agricultural implement 4 to be drawn by an agricultural vehicle such as a tractor. The PTO can be at different heights in different tractors. The precise orientation of primary shaft 6 of the cardan drive hereby depends in practice on which tractor is being used to drive the implement. In an ideal situation the primary shaft extends in line with PTO 2. However, because the PTO can be at different heights this ideal situation is rarely achieved. Primary shaft 6 is therefore connected via a coupling element 17 to PTO 2 of tractor 1. Coupling element 17 is preferably a homokinetic coupling, which means that the rotation speed of the PTO is transmitted directly proportionally to the primary shaft. At any moment during the rotating movement the rotation speed of the PTO will be the same as the rotation speed of primary shaft 6. Because the angle between the PTO and the primary shaft is ideally 0, and will always be relatively small in practice, known homokinetic couplings can be applied for the purpose of connecting PTO 2 to primary shaft 6. An example of a known coupling is a Thompson coupling or a Rzeppa joint.

Primary shaft 6 preferably takes a telescopic form so that movements of the agricultural vehicle relative to the agricultural implement can be taken up by varying the length of primary shaft 6. It will be apparent here that rotating movements of the agricultural vehicle relative to the agricultural implement are taken up by respective couplings 17 and 8, between which the primary shaft is held. Thus formed is a dynamic cardan drive which is intended to be flexible, in particular to take up movements between agricultural vehicle and agricultural implement and simultaneously transmit a rotation from PTO 2 to input shaft 3.

In order to guarantee optimal operation of the cardan drive, the primary shaft has to have sufficient space to slide in and out. On the tractor side, where primary shaft 6 is coupled to PTO 2, there is little or no possibility of increasing the space for movement of the primary shaft. Only the homokinetic coupling can be chosen such that it takes up minimum space. The construction of the cardan drive is therefore optimized at the second end of the primary shaft (the first end of the primary shaft being coupled to the PTO) so as to give the primary shaft sufficient space to move.

Secondary shaft 7 is connected to input shaft 3 of the implement. There is typically a coupling element 18 between the secondary shaft and the input shaft, which preferably lie substantially in line. This coupling 18 is placed between the secondary shaft and input shaft 3 in order to compensate for imperfections in alignment between secondary shaft 7 and input shaft 3. Different types of coupling are known, including a universal joint (a single universal joint) or a spline coupling with convex spline. Secondary shaft 7 can be very short in practice when input shaft 3 of the implement and intermediate element 8 lie close together.

Primary shaft 6 is connected to secondary shaft 7 via a double universal joint. The double universal joint comprises a first universal joint and a second universal joint. The first universal joint is constructed by first yoke 9 and second yoke 10 which are positioned at right angles over each other and in which a cross-shaped element 14 is mounted in order to mutually connect the yokes positioned over each other. Similarly to the first universal joint, the second universal joint is formed by a third yoke 11 which is positioned at right angles over a fourth yoke 12, wherein a cross-shaped element 15 is likewise placed between the protruding yoke elements of the third yoke and fourth yoke 11, 12 in order to connect the yokes. Second yoke 10 and third yoke 11 are connected fixedly to each other and form the intermediate element 8 of the double universal joint. Giving intermediate element 8 the smallest possible length creates space for movement of primary shaft 1.

Intermediate element 8 is connected fixedly to implement 4 via a frame 5. Intermediate element 8 is connected to frame 5 here via bearings 13, preferably roller bearings placed directly onto one of the two yokes 10, 11. The frame can further be fixed to the implement such that the frame is attached to the implement at the moment of operation of the cardan drive. One predetermined position of the primary shaft is defined by fixedly connecting the intermediate element to the implement via frame 5, wherein the rotation transmission from the primary to the secondary shaft is homokinetic. In positions other than the defined position of the primary shaft, which positions may occur due to movement of the implement relative to the tractor, the rotation transmission will not be homokinetic. This would appear to be an adverse consequence of the invention, where the intermediate element is fixed relative to the implement, since the known homokinetic couplings have a self-regulating intermediate element and thereby always guarantee a homokinetic connection. This is found in practice however not to cause any significant drawbacks, this for the following reasons. A high power can be transmitted from the PTO to the implement via the cardan drive. A high power is typically transmitted when the implement is in an operating position. In substantially all agricultural implements the operating position is activated when tractor and implement are in a straight line and move forward. During manoeuvring the implement will typically move relative to the agricultural vehicle and the primary shaft typically moves away from its determined (ideal) position. Hardly any power is however transmitted to the implement during manoeuvring. It is not therefore essential during manoeuvring for the coupling between the primary and the secondary shaft to operate in homokinetic manner. Fixed connection of the intermediate element of the double universal joint will not therefore have any adverse effect in practice on the operation of the agricultural implement.

In order to achieve a homokinetic operation of the double universal joint the intermediate element 8 is positioned such that the angle $\alpha$ (angle between primary shaft 6 and the rotation axis of intermediate element 8) is substantially equal to the angle $\beta$ (angle between secondary shaft 7 and the rotation axis of intermediate element 8). In order to make possible such a positioning of intermediate element 8 for different positions of primary shaft 6 (due to the different PTO heights of the tractor) the frame is provided with adjusting means. Intermediate element 8 is connected via bearings 13 to frame 5, which is in turn connected to implement 4. Making the frame adjustable makes it possible to adjust the position and angular position of the bearings relative to the implement. Intermediate element 8 can hereby be placed in an ideal position. Adjusting means 5.1 and 5.2 for mechanically positioning and adjusting the position of one element relative to another element are generally known and are in frequent use in mechanical engineering. No further details of the frame are therefore described, this because the skilled person can, on the basis of the described effects, construct a frame wherein the position and angular position of the intermediate element are adjustable relative to implement 4. Within the context of this invention the term 'two roller bearings' is defined as a bearing with two rows. It will be apparent here that the term 'two roller bearings' is understood to mean two separate single-row bearings as well as a single double-row bearing.

Figure 3:
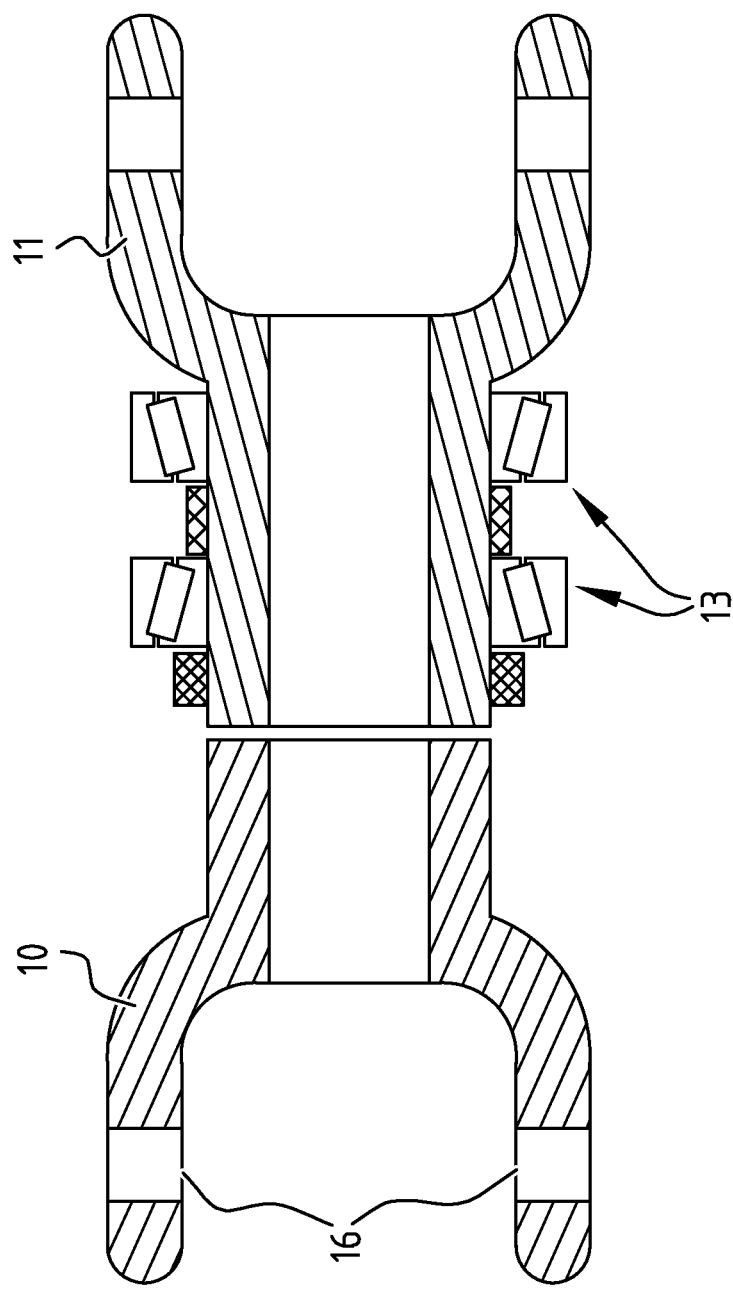
FIG. 3 shows an intermediate element according to a first embodiment of the invention.

FIG. 3 shows a first embodiment of the intermediate element according to the invention. The figure shows second yoke 10 (which, together with first yoke 9 and first cross-shaped element 14, forms the first universal joint of the double universal joint). Second yoke 10 has on the left-hand side two protruding yoke elements, each provided with a hole 16 into which the cross-shaped element can be mounted. Second yoke 10 comprises on its right-hand side a connecting element such that second yoke 10 can be connected to further elements in the cardan drive. The figure further shows third yoke 11 (which, together with fourth yoke 12 and second cross-shaped element 15, forms the second universal joint of the double universal joint). Third yoke 11 has on its right-hand side two protruding yoke elements, each having an opening for mounting of the cross-shaped element, similarly to second yoke 10. Third yoke 11 can have on its left-hand side a connecting element (not shown) with which third yoke 11 can be coupled to further elements in the cardan drive.

Second yoke 10 and third yoke 11 are directly connected to each other via connecting means. An example of connecting means is a bolt connection or spline connection. Due to the direct connection of second yoke 10 and third yoke 11 to each other the overall length A of the intermediate element can be minimal.

FIG. 3 shows how second yoke 10 is shorter than third yoke 11. The reason for this is practical, such yokes typically being standard elements. Yoke 10 is a standard element which can be purchased, while yoke 11 is an individually modified element to enable attachment to frame 5. Third yoke 11 is provided with a bearing mounting surface on which roller bearings 13 can be mounted. The mounting, positioning and fixing of roller bearings 13 over a bearing mounting surface are known to the skilled person and not therefore discussed in detail. In the embodiment of FIG. 3 two bearings are mounted on one yoke. The reason for this is that the connection between second yoke 10 and third yoke 11 can in practice never be formed wholly perfectly and without play. The result hereof is that the rotation axis of second yoke 10 and the rotation axis of third yoke 11 do not coincide 100%. Roller bearings, when mounted one on the second yoke and the other on the third yoke, would hereby be unable to move wholly synchronously, whereby unnecessary wear of the roller bearings would occur. Roller bearings would hereby break prematurely. This wear is prevented by providing the two roller bearings on one yoke, in the figure third yoke 11. It is in this way that the rotation of the intermediate element is determined by the rotation axis of third yoke 11. Because the two roller bearings are mounted on one yoke, the roller bearings will be able to move wholly synchronously and no unnecessary wear will occur.

Figure 4:
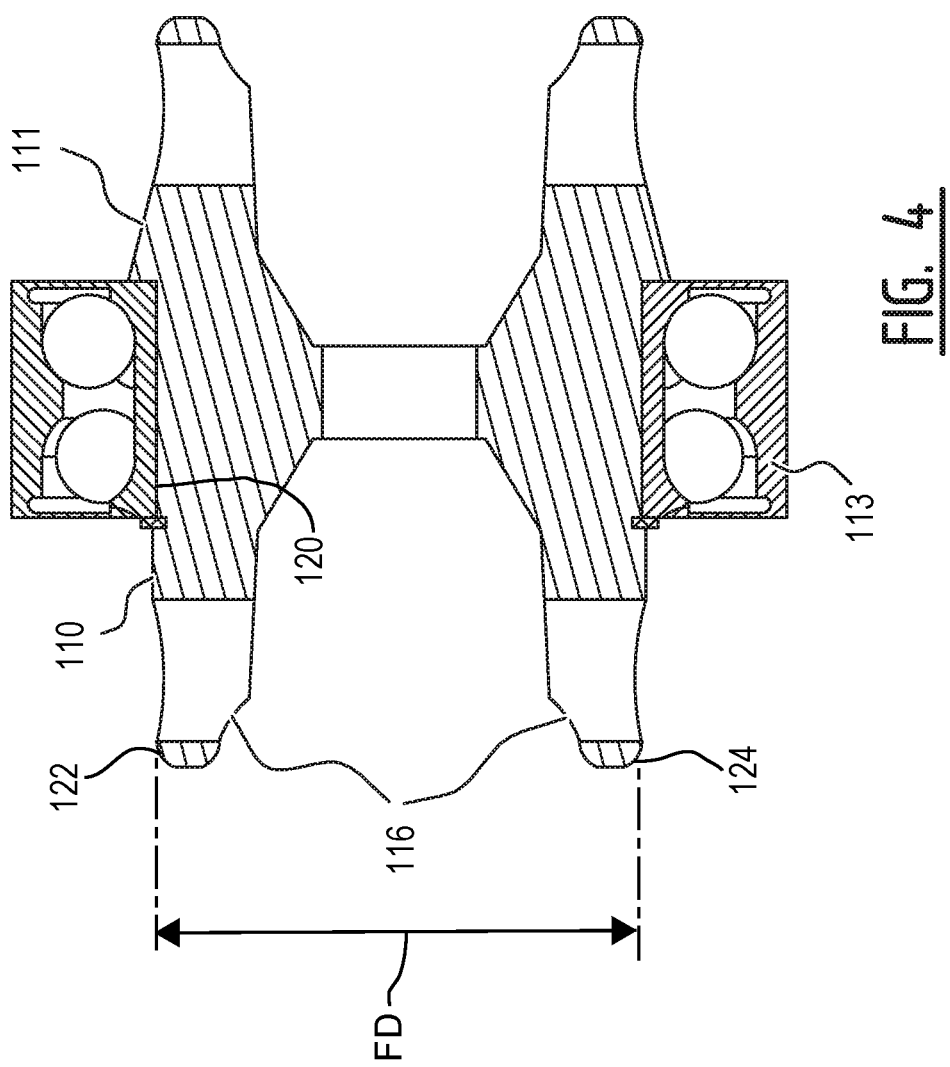
FIG. 4 shows an intermediate element according to a second embodiment of the invention.

FIG. 4 shows an alternative construction of the intermediate element according to the invention. According to this embodiment, second yoke 110 and third yoke 111 are manufactured integrally. The intermediate element is provided with a bearing mounting surface 120 for mounting of bearings 113 such that the intermediate element can be connected to frame 5. The diameter of the bearing mounting surface 120 is greater here than the furthest distance FD between outer surfaces of two protruding yoke elements 122 and 124 having holes 116, of at least one of the two yokes 110, 111. In this way bearing 113 can be positioned over the yokes onto the bearing mounting surface. In the shown exemplary embodiment of FIG. 4 the bearing 113 can be positioned via the left-hand side over second yoke 110 onto the bearing mounting surface.

According to a further embodiment of the invention, which is not shown, a shaft part with spline and the third yoke 11, 111 are manufactured integrally and such that second yoke 10, 110 can be mounted on third yoke 11, 111 over the shaft part with spline. In this way the second and third yoke can be connected to each other directly and in simple manner. Third yoke 11, 111 can be provided here with bearing mounting surfaces 120 for mounting of the bearings 113.

The specific construction of the cardan drive according to the invention, particularly the specific construction of the intermediate element of the double universal joint between primary shaft 6 and secondary shaft 7, allows reinforcement of specifically those elements of the cardan drive which are most heavily loaded. The placing of a heavier known double universal joint, similar to the homokinetic connection 17 between PTO 2 and primary shaft 6, would entail further drawbacks which would ultimately make the cardan drive impracticable. A heavy double universal joint would thus take up too much space, whereby primary shaft 6 is given too little space to move.

Intermediate element 8 is preferably formed such that it has an overall length a, as measured parallel to the rotation axis of the intermediate element, which is less than 50 cm, preferably less than 40 cm, more preferably less than 30 cm. Primary shaft 6 is in this way given sufficient space to move.

The above described embodiments and the shown figures are illustrative and serve only for a better understanding of the invention. The invention is not limited to the described embodiments. Different alternatives described in the text can be freely combined by a skilled person and developed in more detail to form an operational whole without departing from the essence of the invention. The scope of protection of the invention will therefore be defined solely by the claims.

The invention claimed is:

1. A Cardan drive for connecting a power take-off (PTO) of an agricultural vehicle to an input shaft of an agricultural implement, wherein the Cardan drive comprises:
   a primary shaft;
   a secondary shaft; and
   a double universal joint, the primary shaft and the secondary shaft are mutually connected via the double universal joint to obtain a homokinetic connection between the primary shaft and the secondary shaft, the double universal joint having:
      bearings; and
      an intermediate element formed substantially by two yokes of the double universal joint, wherein at least one of the two yokes is connected via the bearings to a frame provided for attachment to the agricultural implement, at least one of the two yokes having a bearing mounting surface diameter that is greater than the furthest distance between outer surfaces of two protruding yoke elements of the one of the yokes allowing the bearing to pass over the protruding yoke elements and be positioned on the bearing mounting surface.

2. The Cardan drive as claimed in claim 1, wherein the frame is adjustable such that at least one of an angle and position of the bearings are adjustable relative to the agricultural implement.

3. The Cardan drive as claimed in claim 1, wherein the bearings comprise at least two roller bearings.

4. The Cardan drive as claimed in claim 1, wherein the intermediate element is manufactured integrally with the two yokes.

5. The Cardan drive as claimed in claim 1, wherein the primary shaft is formed by a first and a second element which are telescopically movable relative to each other so that the length of the primary shaft can vary.

6. The Cardan drive as claimed in claim 1, wherein the Cardan drive comprises successively the primary shaft, a first yoke, a first cross-shaped element, a second yoke, a third yoke, a second cross-shaped element, a fourth yoke and the secondary shaft, wherein the second and the third yoke form the intermediate element.

7. The Cardan drive as claimed in claim 1, wherein the primary shaft is further provided with a homokinetic coupling with which the primary shaft can be attached to the PTO.

8. The Cardan drive as claimed in claim 1, wherein the secondary shaft is further provided with a universal joint or spline coupling with convex spline with which the secondary shaft can be attached to the input shaft of the agricultural implement.

9. The Cardan drive as claimed in claim 1, wherein the intermediate element has an overall length of less than 50 cm.

10. The Cardan drive as claimed in claim 9, wherein the overall length is less than 40 cm.

11. The Cardan drive as claimed in claim 10, wherein the overall length is less than 30 cm.

12. A Cardan drive in combination with an agricultural implement, the Cardan drive connecting a power take-off (PTO) of an agricultural vehicle to an input shaft of the agricultural implement, wherein the Cardan drive comprises:
   a primary shaft;
   a secondary shaft; and
   a double universal joint, the primary shaft and the secondary shaft are mutually connected via the double universal joint to obtain a homokinetic connection between the primary shaft and the secondary shaft, the double universal joint having:
   bearings; and
   an intermediate element formed substantially by two yokes of the double universal joint, wherein at least one of the two yokes is connected via the bearings to a frame provided for attachment to the agricultural implement, at least one of the two yokes having a bearing mounting surface diameter that is greater than the furthest distance between outer surfaces of two protruding yoke elements of the one of the yokes allowing the bearing to pass over the protruding yoke elements and be positioned on the bearing mounting surface.

13. The Cardan drive and agricultural implement as claimed in claim 12, wherein the intermediate element is positioned such that the angle between the rotation axis of the intermediate element and the primary shaft is equal to the angle between the rotation axis of the intermediate element and the secondary shaft.

* * * * *